(12) United States Patent
Song et al.

(10) Patent No.: US 12,130,541 B2
(45) Date of Patent: Oct. 29, 2024

(54) FLASH LED MODULES

(71) Applicant: Samsung Electronics Co., Ltd., Suwon-si (KR)

(72) Inventors: Jongsup Song, Hwaseong-si (KR); Taehyun Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 286 days.

(21) Appl. No.: 17/560,457

(22) Filed: Dec. 23, 2021

(65) Prior Publication Data
US 2022/0244620 A1 Aug. 4, 2022

(30) Foreign Application Priority Data

Feb. 4, 2021 (KR) .................. 10-2021-0015824

(51) Int. Cl.
*G03B 15/05* (2021.01)
(52) U.S. Cl.
CPC .................. *G03B 15/05* (2013.01)
(58) Field of Classification Search
CPC .............................................. G03B 15/05
USPC .......................................................... 362/16
See application file for complete search history.

(56) References Cited

U.S. PATENT DOCUMENTS

| | | | |
|---|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,316,488 B2 | 1/2008 | Wall |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |

(Continued)

FOREIGN PATENT DOCUMENTS

KR 20110086307 A 7/2011

*Primary Examiner* — Elmito Breval
*Assistant Examiner* — Hana S Featherly
(74) *Attorney, Agent, or Firm* — Myers Bigel, P.A.

(57) ABSTRACT

A flash light emitting diode (LED) package includes: a first substrate including first and second opposing surfaces; an LED device on the first surface of the first substrate and having a light emitting region; a shutter on the LED device, and configured to expose and cover the light emitting region; a second substrate on the second surface of the first substrate; and a shutter driving unit on the second substrate and configured to move the shutter. The shutter driving unit includes: a magnetic field forming unit configured to generate a magnetic field in response to application of a current, a power generation unit having a permanent magnet and configured to generate power and/or movement in response to the magnetic field, and a power transmission unit connected between the shutter and the power generation unit and configured to transmit the power and/or movement to move the shutter.

20 Claims, 10 Drawing Sheets

(56) References Cited

U.S. PATENT DOCUMENTS

| | | | |
|---|---|---|---|
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,965,881 B2 | 6/2011 | Reese et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Cho et al. | |
| 8,735,931 B2 | 5/2014 | Han et al. | |
| 8,766,295 B2 | 7/2014 | Kim | |
| 9,131,135 B2 | 9/2015 | Jarvis et al. | |
| 9,234,637 B2 | 1/2016 | Jonsson | |
| 9,357,042 B2 | 5/2016 | Liao | |
| 2007/0110433 A1 | 5/2007 | Masahiko | |
| 2014/0374786 A1 | 12/2014 | Bierhuizen | |
| 2019/0101808 A1* | 4/2019 | Byon | H04N 23/687 |
| 2019/0148607 A1 | 5/2019 | Wang | |
| 2019/0165318 A1* | 5/2019 | Choi | H10K 59/124 |

* cited by examiner

FLASH LED MODULES

CROSS-REFERENCE TO RELATED APPLICATION(S)

This application claims priority under 35 U.S.C. § 119 to Korean Patent Application No 10-2021-0015824 filed on Feb. 4, 2021 in the Korean Intellectual Property Office, the disclosure of which is herein incorporated by reference in its entirety.

BACKGROUND

The present inventive concepts relate to flash light emitting diode (LED) modules.

Some cameras may incorporate a flash mechanism to assist in illumination of an image captured by the camera. Since an LED has several advantages, such as low power consumption, high brightness, a long lifespan, and the like, a flash LED module including an LED device or an LED package may be employed in electronic devices such as mobile phones equipped with a camera module. Since a fluorescent film of the LED device may be visible to an exterior of the electronic device due to a function of the Flash LED module, it may be beneficial to develop a flash LED module matching the exterior of the electronic device.

SUMMARY

Aspects of the present inventive concepts may provide flash LED modules matching an exterior of an electronic device.

According to an aspect of the present inventive concepts, a flash LED module includes: a first substrate including first and second opposing surfaces; an LED device on the first surface of the first substrate and having a light emitting region; a shutter on the LED device, and configured to expose and cover the light emitting region; a second substrate on the second surface of the first substrate; and a shutter driving unit on the second substrate and configured to move the shutter, wherein the shutter driving unit includes: a magnetic field forming unit configured to generate a magnetic field in response to application of a current; a power generation unit having a permanent magnet and configured to generate power and/or movement in response to the magnetic field; and a power transmission unit connected between the shutter and the power generation unit and configured to transmit the power and/or movement to move the shutter.

According to an aspect of the present inventive concepts, an electronic device includes an optical window and a flash LED module configured to emit light in a first direction through the optical window. The flash LED module includes: an LED device including an LED chip and a reflective structure on a side surface of the LED chip, the reflective structure defining a light emitting region; a shutter having a first color between the light emitting region and the optical window, the shutter configured to expose and cover the light emitting region by being moved in a second direction, perpendicular to the first direction; a shutter driving unit below the LED device, the shutter driving unit configured to move the shutter in the second direction; and a light blocking layer having the first color surrounding a periphery of the optical window.

According to an aspect of the present inventive concepts, a flash LED module includes: an LED device including an LED chip, a reflective structure on a side surface of the LED chip, and a light emitting region, wherein the reflective structure surrounds a periphery of the light emitting region; a shutter disposed on a first surface of the LED device, and configured to expose and cover the light emitting region in a first direction; a shutter driving unit on a second surface of the LED device, the shutter driving unit configured to move the shutter in a second direction, perpendicular to the first direction; a housing accommodating the LED device, the shutter, and the shutter driving unit; and a lens cover on the housing and having a lens region overlapping the light emitting region in the first direction, wherein in the second direction. A width of the light emitting region in the second region is smaller than a width of the lens region in the second direction, and a width of the shutter in the second direction is equal to or greater than the width of the light emitting region in the second direction.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, embodiments of the present inventive concepts will be described with reference to the accompanying drawings.

Figure 1:
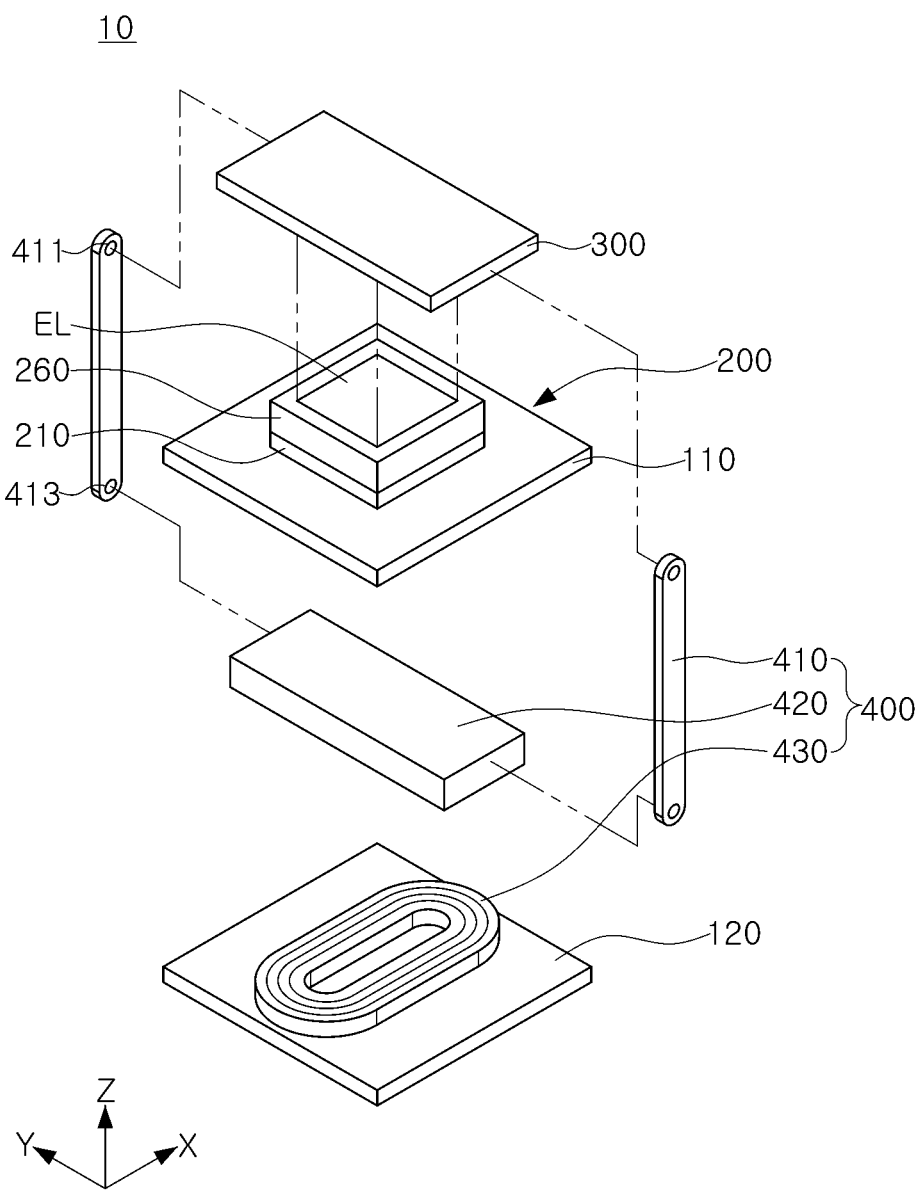
FIG. 1 is an exploded perspective view illustrating some components of a flash LED module according to an example embodiment of the present inventive concepts.
Figure 2A:
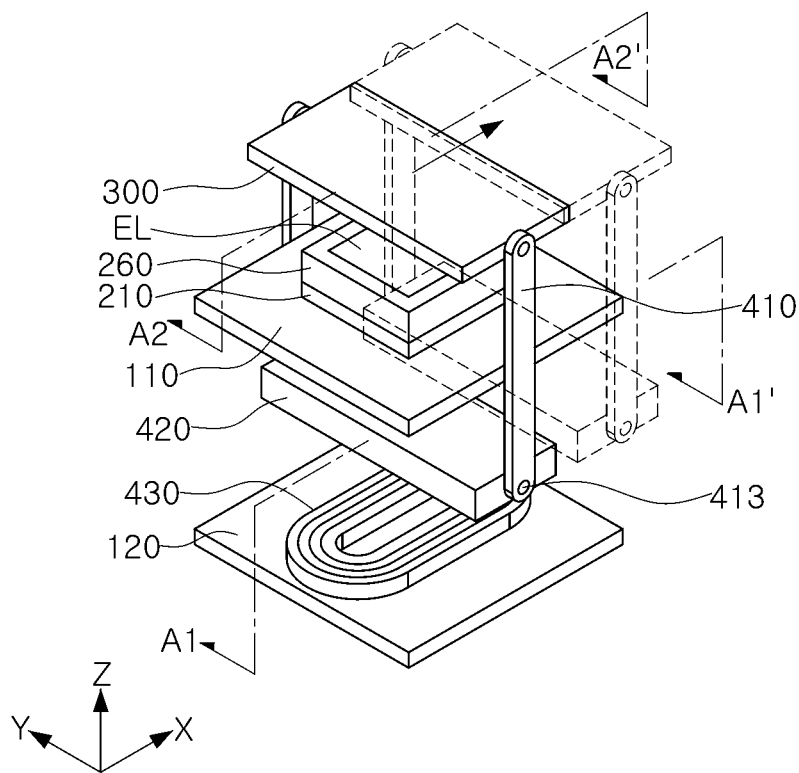
FIG. 2A is a perspective view illustrating an operating principle of a shutter and a shutter driving unit in the flash LED module of FIG. 1.
Figure 2B:
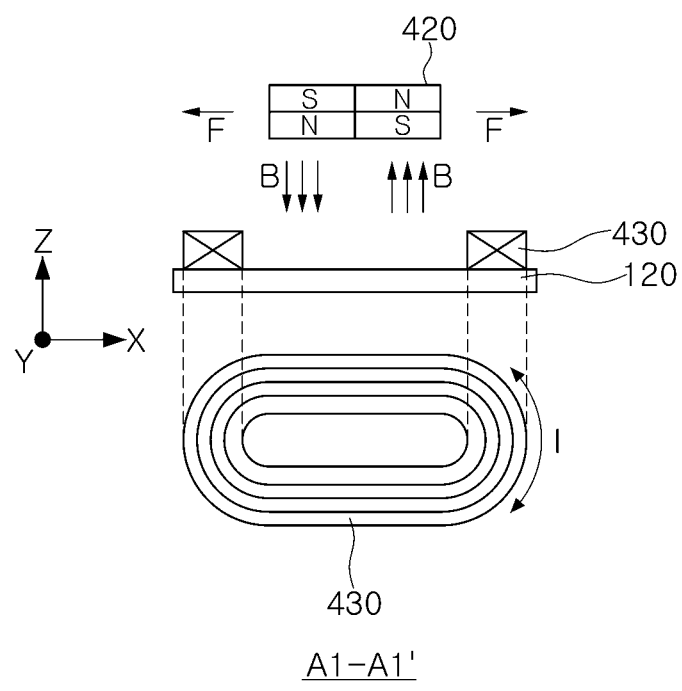
FIGS. 2B and 2C are cross-sectional views taken along line A1-A1' and A2-A2' of FIG. 2A, respectively.
Figure 2C:
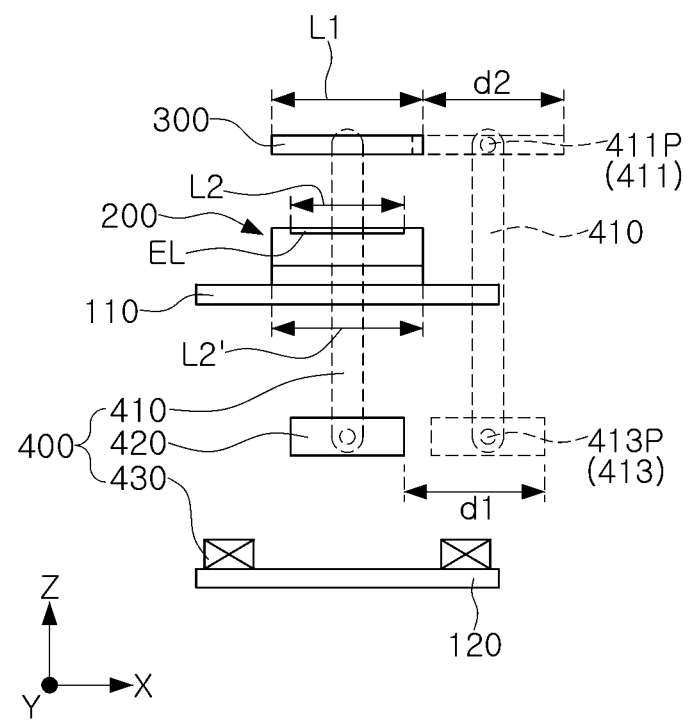

FIG. 1 is an exploded perspective view illustrating some components of a flash LED module 10 according to an example embodiment of the present inventive concepts, and FIGS. 2A to 2C are perspective views illustrating an operating principle of a shutter 300 in the flash LED module 10 of FIG. 1. As used herein, the term "module" refers to a physical structure that may be composed of one or more mechanical and/or electrical elements and is not intended to be limiting to the physical structure. The term "module" may be synonymous, at least, with "part," "subassembly," "apparatus," "machine," or "device." As used herein, the term "and/or" includes any and all combinations of one or more of the associated listed items.

Referring to FIG. 1, a flash LED module 10 according to an example embodiment may include first and second substrates 110 and 120, an LED device 200, a shutter 300, and a shutter driving unit 400.

The first and second substrates 110 and 120 may be disposed to be spaced apart from each other in a vertical direction (e.g., a Z-axis direction). The LED device 200 may be mounted on an upper surface of the first substrate 110, and the LED device 200 may be electrically connected to a circuit of the first substrate 110. The second substrate 120 may be disposed on a lower surface of the first substrate 110, and a shutter driving unit 400 for moving the shutter 300 may be mounted on the second substrate 120. The shutter driving unit 400 may be electrically connected to a circuit of the second substrate 120. The first and second substrates 110 and 120 may be circuit boards supplying a current to the LED device 200 and the shutter driving unit 400, respectively. For example, the first and second substrates 110 and 120 may be substrates such as a printed circuit board (PCB), a metal core PCB (MCPCB), a metal PCB (MPCB), a flexible PCB (FPCB), and the like.

In an example embodiment, when the LED device 200 mounted on the first substrate 110 is operated, the shutter driving unit 400 mounted on the second substrate 120 may move the shutter 300 in a horizontal direction (e.g., an X-axis direction) to expose a light emitting region EL of the LED device 200 in a vertical direction (e.g., the Z-axis direction). Accordingly, in order to interlock the LED device 200 and the shutter driving unit 400, the first and second substrates 110 and 120 may be electrically connected to each other. In addition, the first and second substrates 110 and 120 may include a connector ("CNT" in FIGS. 5B and 5C) connected to a main board of the electronic device on which the Flash LED module 10 is mounted.

The LED device 200 may be disposed on the first substrate 110, and may have a light emitting region EL defined by a reflective structure 260. The LED device 200 may include an LED chip (referring to '250' in FIGS. 3A and 3B) on a wiring board 210 and surrounded by the reflective structure 260, and may be disposed on the first substrate 110. It will be understood that "an element A surrounds an element B" (or similar language) as used herein means that the element A is at least partially around the element B but does not necessarily mean that the element A completely encloses the element B. The LED device 200 may be a flash device emitting white light by combining the LED chip with a wavelength conversion element. A detailed description of the components of the LED device 200 will be described herein with reference to FIGS. 3A and 3B. The LED device 200 may expose a color of the wavelength conversion element through the light emission region EL, and the wavelength conversion element may have a color, different from a color of the set cover (referring to '11' in FIG. 7) of an electronic device on which the Flash LED module 10 is mounted and a color of a light blocking layer (referring to "BL" in FIG. 8) defining an optical window of the electronic device. In an example embodiment, a shutter 300 may be disposed to completely cover the light emitting region EL in a vertical direction in a non-operating state of the LED device 200, and may have the same color as the color of the set cover and the color of the light blocking layer. Here, the same color does not mean the exact same color physically and optically, but refers to a degree to which the color of the set cover, the color of the light blocking layer, and the color of the shutter can be recognized by an observer as a same color (e.g., in terms of exterior design). In other words, the same color may refer to ranges of colors that are substantially similar enough to one another so as to be indistinguishable from one another by a human observer.

The shutter 300 may be disposed above and/or on the LED device 200, and may cover the light emitting region EL in a first direction (e.g., the Z-axis direction in FIG. 1). The shutter 300 may be moved in a second direction (e.g., the X-axis direction in FIG. 1) depending on whether the LED device 200 is operating. For example, the shutter 300 may be located so as to completely overlap the light emitting region EL in a non-operating state of the LED device 200, and may be positioned to be separated from the light emission region EL so that the light emission region EL is exposed in an operating state of the LED device 200. It will be understood that "an element A overlaps an element B" (or similar language) as used herein means that at least one line intersecting both the elements A and B exists. In some embodiments the third direction D3 may be perpendicular to the second direction D2. In an example embodiment, the shutter 300 may have the same color as the color of the set cover and the light blocking layer. Accordingly, an exterior of the electronic device having a predetermined color can be implemented in the non-operating state of the LED device 200. In addition, in an example embodiment, since the shutter driving unit 400 for moving the shutter 300 is disposed below the LED device 200, expansion of a horizontal space for disposing the shutter driving unit 400 in addition to a moving space of the shutter 300 may be reduced and/or minimized, and as a result, a flash LED module 10 having a reduced size may be implemented.

The shutter driving unit 400 may be mounted on the second substrate 120, and may include a power transmission unit 410, a power generation unit 420, and a magnetic field forming unit 430. As the shutter driving unit 400, various types of linear actuators may be used. The shutter driving unit 400 may be a voice coil actuator (VCA), but is not limited thereto, and may include, for example, a piezoelectric actuator using a piezoelectric effect element.

The power transmission unit 410 may transmit power (e.g., force) generated by interaction between the magnetic field forming unit 430 and the power generation unit 420 to the shutter 300 to cause movement of the shutter 300. For example, the power transmission unit 410 may include a connection unit having a first end 411 interlocked with the shutter 300 and a second end 413 through which the power of the power generation unit 420 is transmitted. The material and shape of the connection unit are not particularly limited. As an example, the connection unit is illustrated in a shape of a pair of rods in FIG. 1 and the like, but is not limited thereto, and may have various shapes capable of transmitting the power generated by the power generation unit 420 to the shutter 300. In addition, the power transmission unit 410 may further include additional components capable of transmitting driving force generated from the magnetic forming unit 430 and the power generation unit 420 disposed below the LED device 200 to the shutter 300 disposed above the LED device 200.

The power generation unit 420 may be disposed on the magnetic field forming unit 430, and may apply power to one end of the power transmission unit 410 by interacting with the magnetic field forming unit 430. The power generation unit 420 may include a permanent magnet magnetized in various forms. For example, the power generation unit 420 may include a permanent magnet having a double-sided multi-pole magnetized shape in which different poles are alternately disposed on upper and lower surfaces thereof (see FIG. 2B). The permanent magnet may include, for example, a ferrite magnet, a neodymium magnet, a samarium-cobalt magnet, an alnico magnet, a rubber magnet, and the like. As an example, in FIG. 1, and the like, only a permanent magnet is illustrated in the power generation unit 420, but the power generation unit 420 may further include additional components of various shapes for supporting and moving the permanent magnet.

The magnetic field forming unit 430 may be disposed on the power generation unit 420 and generate a magnetic field in an axial direction (e.g., the Z-axis direction) to move the power generation unit 420 in a horizontal direction (e.g., X-axis direction). The magnetic field forming unit 430 may include a coil having an elliptical shape including a plurality of windings and in which long axes are arranged in the moving direction of the power generation unit (or permanent magnet) 420. For example, the magnetic field forming unit 430 may be a coil having an elliptical shape in which a diameter (e.g., the major axis of the ellipse) thereof in a first horizontal direction (e.g., the X-axis direction) is longer than a diameter (e.g., the minor axis of the ellipse) in a second horizontal direction (e.g., a Y-axis direction).

In an example embodiment, the shutter driving unit 400 may be disposed on an opposite side of the LED device 200 from the shutter 300 to reduce and/or minimize an increase in a volume of the flash LED module 10, and secure a moving distance of the shutter 300. Therefore, the shutter 300, the LED device 200, the power generation unit 420, and the magnetic field forming unit 430 may be aligned so that at least a portion of each thereof overlaps in a vertical direction or in an optical axis direction (e.g., the Z-axis direction) of light emitted from the LED device 200. The shape of the shutter 300, the power transmission unit 410, the power generation unit 420, and the magnetic field forming unit 430 are not limited to the shape illustrated in the drawings, and may be variously modified in consideration of the movement of the shutter 300 and the power generation unit 420 (or a permanent magnet, a moving distance, and the like.

Hereinafter, operations of the shutter 300 and the shutter driving unit 400 will be described with reference to FIGS. 2A to 2C together. FIGS. 2A to 2C illustrate an operating principle of the shutter 300 and the shutter driving unit 400 in the flash LED module 10 of FIG. 1A. FIG. 2B is a cross-sectional view taken along line A1-A1' in FIG. 2A, and FIG. 2C is a cross-sectional view taken along line A2-A2' in FIG. 2A. In FIGS. 2A to 2C, a description of elements that have been previously described will be omitted for brevity.

Referring to FIGS. 2A and 2B, when the LED device 200 is in a non-operating state, no current is applied to the magnetic field forming unit 430, and the shutter 300 may be disposed to cover the light emitting region EL. With the operation of the LED device 200, as illustrated in FIG. 2B, when a current I is applied to the magnetic field forming unit 430, Lorentz force F may act on the magnetic field forming unit 430 and/or the power generation unit 420 by a magnetic field B generated in an axial direction of the magnetic field forming unit 430 (e.g., in the Z-axis direction). In some embodiments, the power generation unit 420 may include a permanent magnet having a double-sided multi-pole magnetized shape in which different poles (illustrated by 'N' and 'S' in FIG. 2B) are alternately disposed on upper and lower surfaces thereof, though the embodiments of the present inventive concepts are not limited thereto. Here, when the magnetic field forming unit 430 is fixed to the second substrate 120 or a yoke, the power generation unit 420 (or a permanent magnet) may move in a horizontal direction by repulsive force to apply force to the power transmission unit 410, and the shutter 300 receiving power from the power transmission unit 410 may be moved in a horizontal direction (e.g., the X-axis direction). Thus, the power generation unit 420 may generate power and/or movement/motion in response to the magnetic field of the magnetic field forming unit 430. The moving directions of the power generation unit 420 and the shutter 300 may be opposite directions according to the direction of the current applied to the magnetic field forming unit 430.

Referring to FIGS. 2A and 2C together, the power generation unit 420 and the shutter 300 may be moved at the same distance in the horizontal direction (e.g., the X-axis direction). For example, when the power generation unit 420 (or a permanent magnet) moves in a second direction (e.g., the X-axis direction) by a first distance d1, the shutter 300 may move in the second direction (e.g., the X-axis direction) by a second distance d2, and the second distance d2 may be substantially the same as the first distance d1. When the LED device 200 is not operating, the power generation unit 420 and the shutter 300 may return to their initial positions, and the shutter 300 may be aligned to cover the light emission region EL again. A width L1 of the shutter 300 in a second direction (e.g., the X-axis direction) may be equal to or greater than a width L2 of the light emission region EL in the second direction (e.g., the X-axis direction). For example, the width L1 in the second direction (e.g., the X-axis direction) of the shutter 300 may be substantially the same as a width L2' in the second direction (e.g., the X-axis direction) of the LED device 200. The return of the power generation unit 420 and the shutter 300 may be achieved by reversing the direction of a current I applied to the magnetic field forming unit 430, or may be achieved by blocking the current I applied to the magnetic field forming unit 430 when a lower end of the power transmission unit 410 is fixed to an elastic body. In FIGS. 2A and 2C, it is illustrated that the moving distances of the shutter 300 and the power generation unit 420 are substantially the same, but this is a result of simplifying a shape and structure of the power transmission unit 410 in order to explain an operating principle of the shutter driving unit 400. In some example embodiments, when the shape and structure of the power transmission unit 410 are changed, a moving distance d1 of the power generation unit 420 (or a permanent magnet) and a moving distance d2 of the shutter 300 can be different from each other.

A dispositional relationship between the shutter 300, the power transmission unit 410, the power generation unit 420, and the magnetic field forming unit 430 illustrated in FIGS. 2A to 2C is simplified to explain a driving principle of the shutter driving unit 400, and in various example embodiments, additional components for mechanically connecting the shutter 300, the power transmission unit 410, the power generation unit 420, and the magnetic field forming unit 430 may be further included. For example, the power transmission unit 410 may be fixed and/or supported by a housing ('510' in FIG. 5A), a yoke, or the like, and an additional component connected therebetween may be further included between the power generation unit 420 and the power transmission unit 410 and between the shutter 300 and a first end 411 of the power transmission unit 410. In addition, in some example embodiments, the positions of the power generation unit 420 and the magnetic field forming unit 430 may be interchanged with each other. For example, the second substrate 120 may be located between the power generation unit 420 and the first substrate 110, and the magnetic field forming unit 430 may be mounted on the second substrate 120 to face the power generation unit 420.

Figure 3A:
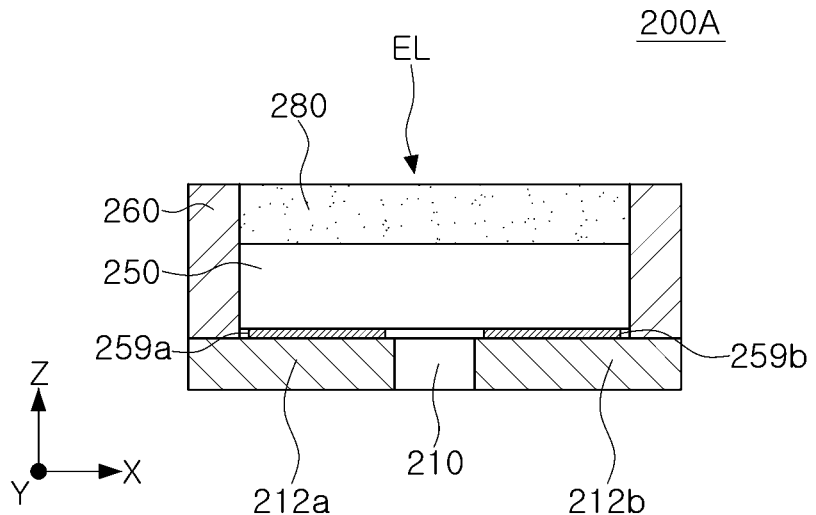
FIGS. 3A and 3B are cross-sectional views of LED devices employable in a flash LED module according to an example embodiment of the present inventive concepts.
Figure 3B:
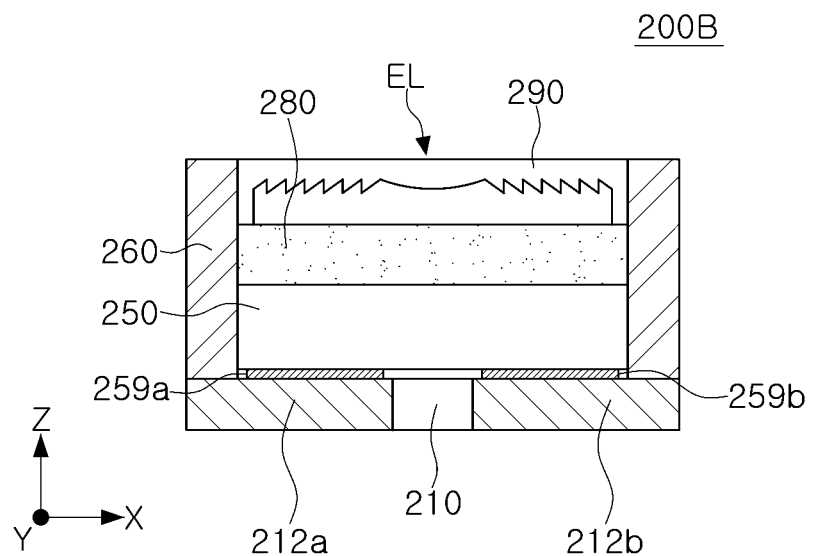

FIGS. 3A and 3B are cross-sectional views of LED devices 200A and 200B that can be employed in a flash LED module according to an example embodiment of the present inventive concepts.

Referring to FIG. 3A, an LED device 200A that can be employed in a flash LED module may include a wiring board 210 having first and second wiring electrodes 212a and 212b, an LED chip 250 disposed on the wiring board 210 and having a first surface on which first and second electrodes 259a and 259b respectively connected to the first and second wiring electrodes 212a and 212b are disposed, a second surface located opposite to the first surface, and a side surface located between the first surface and the second surface, and a wavelength conversion film 280 disposed on the second surface of the LED chip 250. In addition, the LED device 200A may further include a reflective structure 260 surrounding at least the side surface of the LED chip 250 and a side surface the wavelength conversion film 280 to be advantageous in condensing light emitted from the LED chip 250. It will be understood that "an element A surrounds an element B" (or similar language) as used herein means that the element A is at least partially around the element B but does not necessarily mean that the element A completely encloses the element B. The light emitting region EL of the LED device 200A may be provided by the wavelength conversion film 280, and may be defined by the reflective structure 260 (e.g. the reflective structure 260 may be on and, in some embodiments, surround a periphery of the light emitting region EL.

The wiring board 210 may include an insulating resin, a ceramic substrate, and the like. The first and second wiring electrodes 212a and 212b may include metals such as gold (Au), copper (Cu), silver (Ag), and/or aluminum (Al). The LED device 200A may be a chip scale package, and a wiring structure may be directly formed on the first surface of the LED chip 250 by using a semiconductor process at a wafer level. In some embodiments, the first and second electrodes 259a and 259b of the LED chip 250 may also be respectively connected to the first and second wiring electrodes 212a and 212b, by a solder ball, or the like.

The wavelength conversion film 280 may include at least one type of wavelength conversion material converting a part of light emitted at an emission wavelength from the LED chip 250 into light having a first wavelength, different from the emission wavelength. The wavelength conversion film 280 may be a resin layer or a ceramic phosphor film in which at least one wavelength conversion material is dispersed. For example, the wavelength conversion material may be at least one of a phosphor and a quantum dot. For example, the LED device 200A may be configured as follows to emit white light. The LED chip 250 may emit blue light (e.g., the LED chip 250 may emit light having a dominant wavelength ranging from 440 nm to 460 nm). The wavelength conversion material may include a phosphor or quantum dot converting a part of the blue light emitted from the LED chip 250 into yellow light, or may include a plurality of phosphors or quantum dots converting the blue light emitted from the LED chip 250 into red and green light. As described above, the wavelength conversion film 280 may have a predetermined color, and the color of the wavelength conversion film 280 may be recognized from the exterior of the flash LED module and the electronic device. In an example embodiment, the shutter 300 may have a color, different from the color of the wavelength conversion film 280, and may be disposed above the LED device 200A and above the light emitting region EL such that the color of the wavelength conversion film 280 is not exposed to an exterior of the flash LED module and the electronic device. For example, the shutter 300 may have a first color, and the wavelength conversion film 280 may have a second color, different from the first color.

In addition, although not illustrated in the drawings, the LED device 200A may further include a light transmitting film having a low refractive index disposed on the wavelength conversion film 280. In this case, the reflective structure 260 may be formed to further surround the light transmitting film together with the LED chip 250 and the wavelength conversion film 280. Accordingly, the final light emitting region EL may be provided by the light transmitting film.

Referring to FIG. 3B, it can be understood that an LED device 200B is similar to the example embodiment illustrated in FIG. 3A except that it further includes a cell lens 290 disposed on the wavelength conversion film 280. The cell lens 290 may condense or enlarge the light that has passed through the wavelength conversion film 280 and emit the light to the outside of the LED device 200B. The type of the cell lens 290 is not particularly limited, but the cell lens 290 may include, for example a Diffractive Optic Elements (DOE) lens, a Micro-Lens Array (MLA) lens, a Fresnel lens, a flat lens, a meta lens, or the like. The cell lens 290 may include any one of polymer materials such as acrylic, polymethyl methacrylate (PMMA), polyvinyl collide (PVC), polycarbonate (PC), epoxy, high-density polyethylene (HDPE), and silicone, and a glass material such as fused silica, but is not limited thereto. As in the example embodiment of FIG. 3B, when the LED device 200B includes the cell lens 290, the flash LED module may not include an additional optical lens. For example, when the LED device 200B of FIG. 3B is employed in the Flash LED module, an element of the lens cover ("520" in FIG. 5A) may be omitted in the example embodiment of FIG. 5A to be described further herein. As illustrated in FIGS. 3A and 3B, the LED devices 200A and 200B employed in an example embodiment may have a flip-chip structure in which a surface on which the light emitting region EL is provided and an electrode formation surface are opposite to each other, but it is not limited thereto.

Figure 4A:
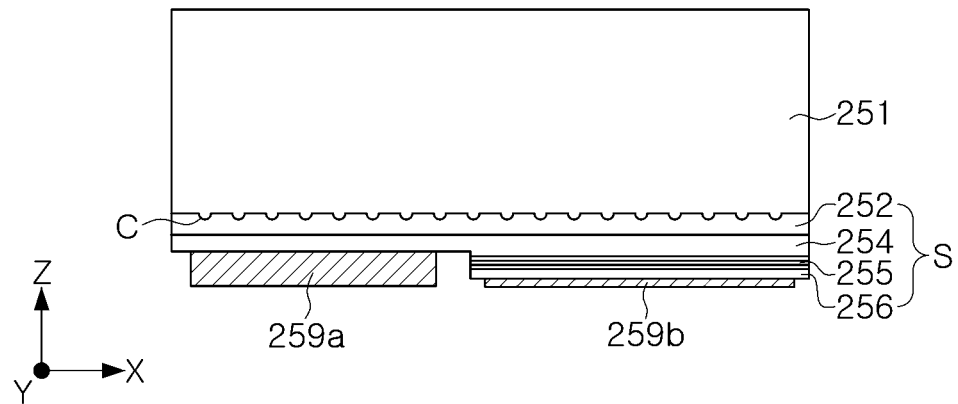
FIGS. 4A and 4B are cross-sectional views illustrating an LED chip employable in the LED devices of FIGS. 3A and 3B.
Figure 4B:
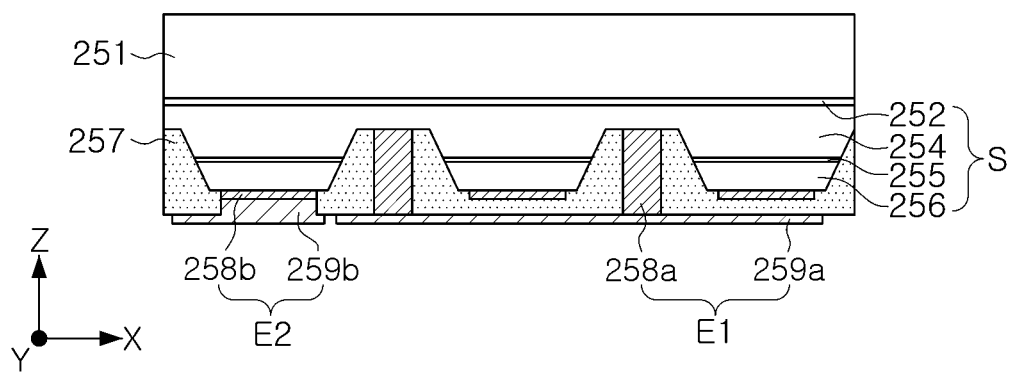

FIGS. 4A and 4B are cross-sectional views illustrating LED chips 250A and 250B that can be employed in the LED devices of FIGS. 3A and 3B.

Referring to FIG. 4A, an LED chip 250A employed in the present example embodiment may include a substrate 251, and a semiconductor laminate S including a buffer layer 252, a first conductivity-type semiconductor layer 254, an active layer 255, and a second conductivity-type semiconductor layer 256 sequentially disposed on the substrate 251. The buffer layer 252 may be disposed between the substrate 251 and the first conductivity-type layer 254. In addition, first and second electrodes 259a and 259b respectively disposed on the first conductivity-type semiconductor layer 254 and the second conductivity-type semiconductor layer 256 may be further included.

The substrate 251 may be an insulating substrate such as sapphire. However, the present inventive concepts are not limited thereto, and the substrate 251 may be a conductive or semiconductor substrate in addition to an insulating substrate. For example, the substrate 251 may be SiC, Si, $MgAl_2O_4$, MgO, $LiAlO_2$, $LiGaO_2$, and GaN in addition to sapphire. An unevenness C may be formed on an upper surface of the substrate 251. The unevenness C may improve a quality of a single crystal grown while improving light extraction efficiency.

The buffer layer 252 may be $In_xAl_yGa_{1-x-y}N$ (0≤x≤1, 0≤y≤1). For example, the buffer layer 252 may be GaN, AlN, AlGaN, or InGaN. If necessary, as the buffer layer 252, a plurality of layers may be combined or the composition thereof may be gradually changed.

The first conductivity-type semiconductor layer 254 may be a nitride semiconductor satisfying n-type $Al_xIn_yGa_{1-x-y}N$ (0≤x≤1, 0≤y≤1, 0≤x+y≤1), and n-type impurities may be Si. For example, the first conductivity-type semiconductor layer 254 may be n-type GaN. The second conductivity-type semiconductor layer 256 may be a nitride semiconductor layer satisfying p-type $Al_xIn_yGa_{1-x-y}N$, and p-type impurities may be Mg. For example, the second conductivity-type semiconductor layer 256 may be implemented in a single layer structure, but may have a multi-layer structure having different compositions, as in the present example embodiment.

The active layer 255 may have a multi-quantum well (MQW) structure in which a quantum well layer and a quantum barrier layer are alternately stacked. For example, the quantum well layer and the quantum barrier layer may be $In_xAl_yGa_{1-x-y}N$ (0≤x≤1, 0≤y≤1, 0≤x+y≤1) having different compositions. In a specific example, the quantum well layer may be $In_xGa_{1-x}N$ (0<x≤1), and the quantum barrier layer may be GaN or AlGaN. The thicknesses of the quantum well layer and the quantum barrier layer may range from 1 nm to 50 nm, respectively. The active layer 255 may be not limited to a multi-quantum well structure, and may be a single quantum well structure.

The first and second electrodes 259a and 259b may be respectively disposed on a mesa-etched region of the first conductivity-type semiconductor layer 254 and the second conductivity-type semiconductor layer 256 so as to be positioned on the same surface. The first electrode 259a is not limited thereto, but may include a material such as Ag, Ni, Al, Cr, Rh, Pd, Ir, Ru, Mg, Zn, Pt, Au, or the like, and may be employed in a single layer or two or more layers. In some example embodiments, the second electrode 259b may be a transparent electrode such as a transparent conductive oxide or a transparent conductive nitride, or may also include graphene. The second electrode 259b may include at least one of Al, Au, Cr, Ni, Ti, and Sn.

Referring to FIG. 4B, similar to the example embodiment of FIG. 4A, the LED chip 250B may include a substrate 251 and a semiconductor laminate S disposed on the substrate 251. The semiconductor laminate S may include a buffer layer 252, a first conductivity-type semiconductor layer 254, an active layer 255, and a second conductivity-type semiconductor layer 256. In addition, the LED chip 250B may include first and second electrode structures E1 and E2 respectively connected to the first and second conductivity-type semiconductor layers 254 and 256.

The first electrode structure E1 may include a connection electrode 258a, such as a conductive via, penetrating through the second conductivity-type semiconductor layer 256 and the active layer 255 to be connected to the first conductivity-type semiconductor layer 254 and a first electrode pad 259a connected to the connection electrode 258a. The connection electrode 258a may be surrounded by an insulating portion 257 to be electrically separated from the active layer 255 and the second conductivity-type semiconductor layer 256. The connection electrode 258a may be disposed in a region where the semiconductor laminate S is etched. The number, shape, pitch, or a contact area with the first conductivity-type semiconductor layer 254 may be appropriately designed for the connection electrodes 258a to reduce contact resistance. In addition, the connection electrodes 258a may be arranged to form rows and columns on the semiconductor laminate S, thereby improving a current flow. The second electrode structure E2 may include an ohmic contact layer 258b and a second electrode pad 259b on the second conductivity-type semiconductor layer 256.

In the connection electrode 258a and the ohmic contact layer 258b, a conductive material having an ohmic characteristic with the first and second conductivity-type semiconductor layers 254 and 256 may have a single-layer or multi-layer structure, and for example, may include a material such as Ag, Al, Ni, Cr, a transparent conductive oxide (TCO), and the like.

First and second electrode pads 259a and 259b may respectively be connected to the connection electrode unit 258a and the ohmic contact layer 258b to function as external terminals of the LED chip 250B, respectively. For example, the first and second electrode pads 259a and 259b may be Au, Ag, Al, Ti, W, Cu, Sn, Ni, Pt, Cr, NiSn, TiW, AuSn, or eutectic metals thereof. The first and second electrode structures E1 and E2 may be disposed in the same direction as each other.

Figure 5A:
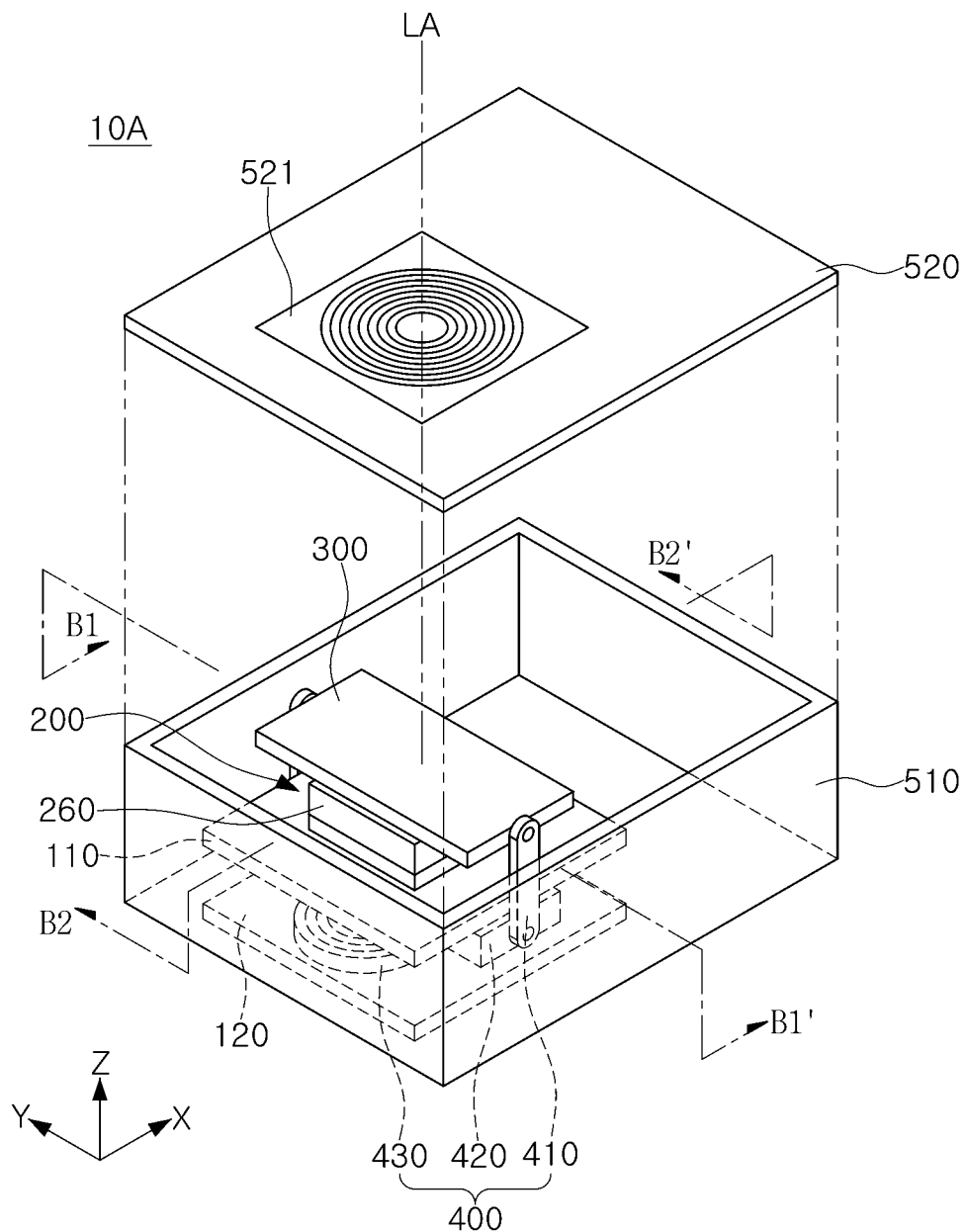
FIG. 5A is a perspective view illustrating a flash LED module according to an example embodiment of the present inventive concepts.
Figure 5B:
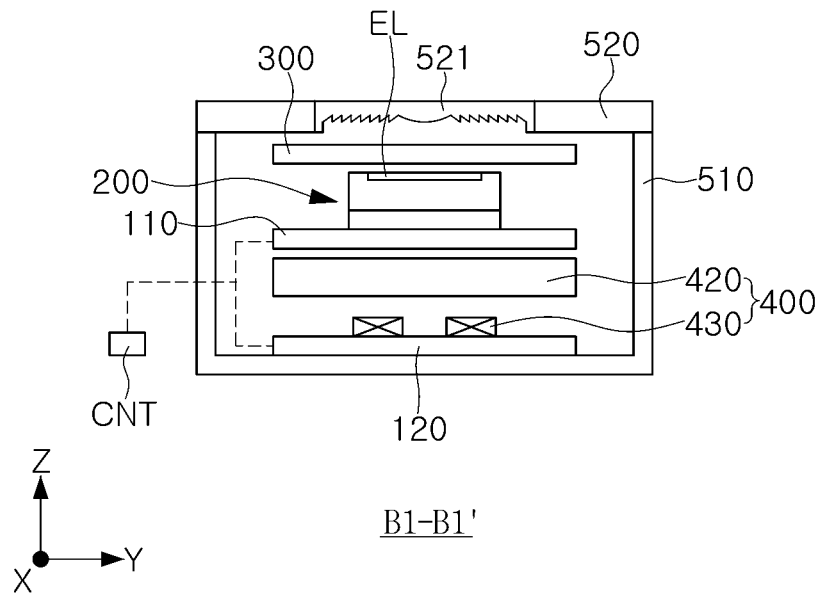
FIGS. 5B and 5C are cross-sectional views taken along lines B1-B1' and B2-B2' of FIG. 5A, respectively.
Figure 5C:
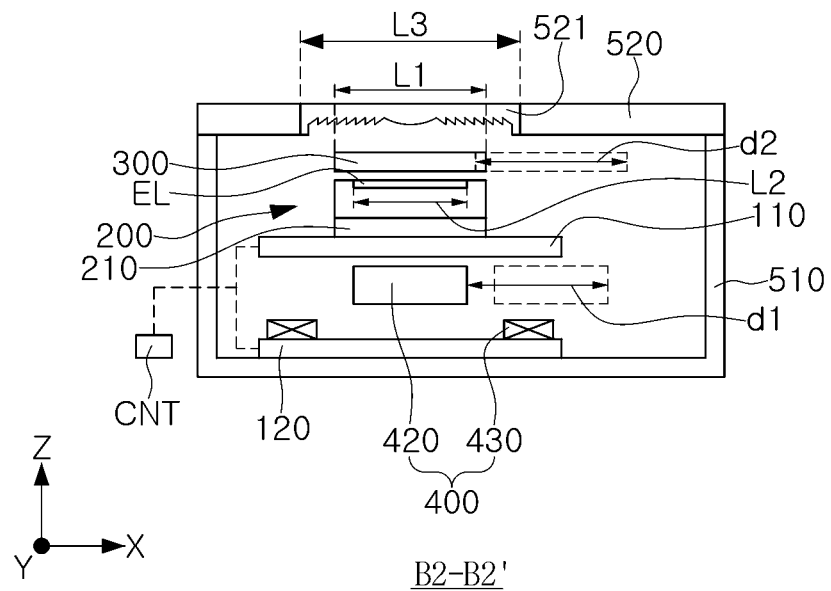

FIG. 5A is a perspective view illustrating a flash LED module 10A according to an example embodiment of the present inventive concepts, and FIGS. 5B and 5C are cross-sectional views taken along lines B1-B1' and B2-B2' of FIG. 5A, respectively. First and second substrates 110 and 120, an LED device 200, a shutter 300, and a shutter driving unit 400 illustrated in FIGS. 5B and 5C correspond to components of FIG. 1 denoted by the same reference numerals, respectively. However, in order to show a form in which the components are mounted in a housing 510, in FIGS. 5B and 5C, a ratio of the components and a spacing therebetween are illustrated to be slightly different from those illustrated in FIG. 1.

Referring to FIGS. 5A to 5C, it can be understood as being similar to the flash LED module 10 of FIG. 1 except that a flash LED module 10A according to an example embodiment further includes a housing 510 in which the first and second substrates 110 and 120, the LED device 200, the shutter 300, and the shutter driving unit 400 are accommodated, and a lens cover 520 disposed on and/or above the housing 510 and having a lens region 521 overlapping the light emitting region EL in a vertical direction (e.g., the Z-axis direction).

The housing 510 may have various shapes to secure a space in which the shutter 300 can be moved. In one example, the housing 510 may have a shape extending in a second direction (e.g., the X-axis direction), and in this case, the shutter 300 may be moved along a length direction (e.g., along a longitudinal axis) of the housing 510. In one example, the housing 510 may be manufactured by an injection process using a polymer material (e.g., a pre-mold material). In addition, the first and second substrates 110 and 120 may be electrically connected to each other within the housing 510, and may be electrically connected to a connector CNT located outside of the housing 510. In some embodiments, though not illustrated in the drawings, the first and second substrates 110 and 120 may be electrically connected to each other outside of the housing 510, or may be respectively connected to separate connectors and respectively connected to the main board of the electronic device.

In addition, additional elements supporting components such as the first and second substrates 110 and 120 and the power generation unit 420 may be further disposed inside the housing 510. For example, an element that separates the magnetic field forming unit 430 from the power generation unit 420 or facilitates the movement of the power generation unit 420 (or a permanent magnet), an element helping a horizontal movement of the shutter 300, and the like may be further included.

The lens cover 520 may be disposed on and/or above the housing 510 and may have a lens region 521 overlapping the light emission region EL in a first direction (e.g., the Z-axis direction). When the LED device 200 is not operating, a shutter 300 may be disposed between the light emission region EL and the lens region 521, such that it is possible to prevent a color of the light emission region EL or the wavelength conversion film (280 in FIG. 3A) from being exposed through the lens region 521. In one example, the lens cover 520 may have a plate shape (e.g., a structure having a circular, rectangular, or other polygonal shape in plan view), and may be supported on a sidewall of the housing 510. The structure and shape of the lens cover 520 may be variously changed. The lens region 521 may be disposed to have an optical axis LA passing through a center of the light emission region EL, and may be used as an optical element capable of uniformly dispersing light emitted from the LED device 200 at a wide angle. In one example, the lens region 521 may be a Fresnel lens. The lens region 521 may have an area, larger than the area of the light emission region EL so as to sufficiently cover the light emission region EL. For example, in the second direction (e.g., the X-axis direction) in which the shutter 300 is moved, a width L2 of the light emission region EL may be smaller than a width L3 of the lens region 521, and a width L1 of the shutter 300 may be at least equal to or greater than the width L2 of the light emitting region EL. In one example embodiment, the shutter 300, the LED device 200, and the shutter driving unit 400 are disposed to overlap in an optical axis (LA) direction, so that the size of the housing 510 can be reduced and/or minimized.

Figure 6A:
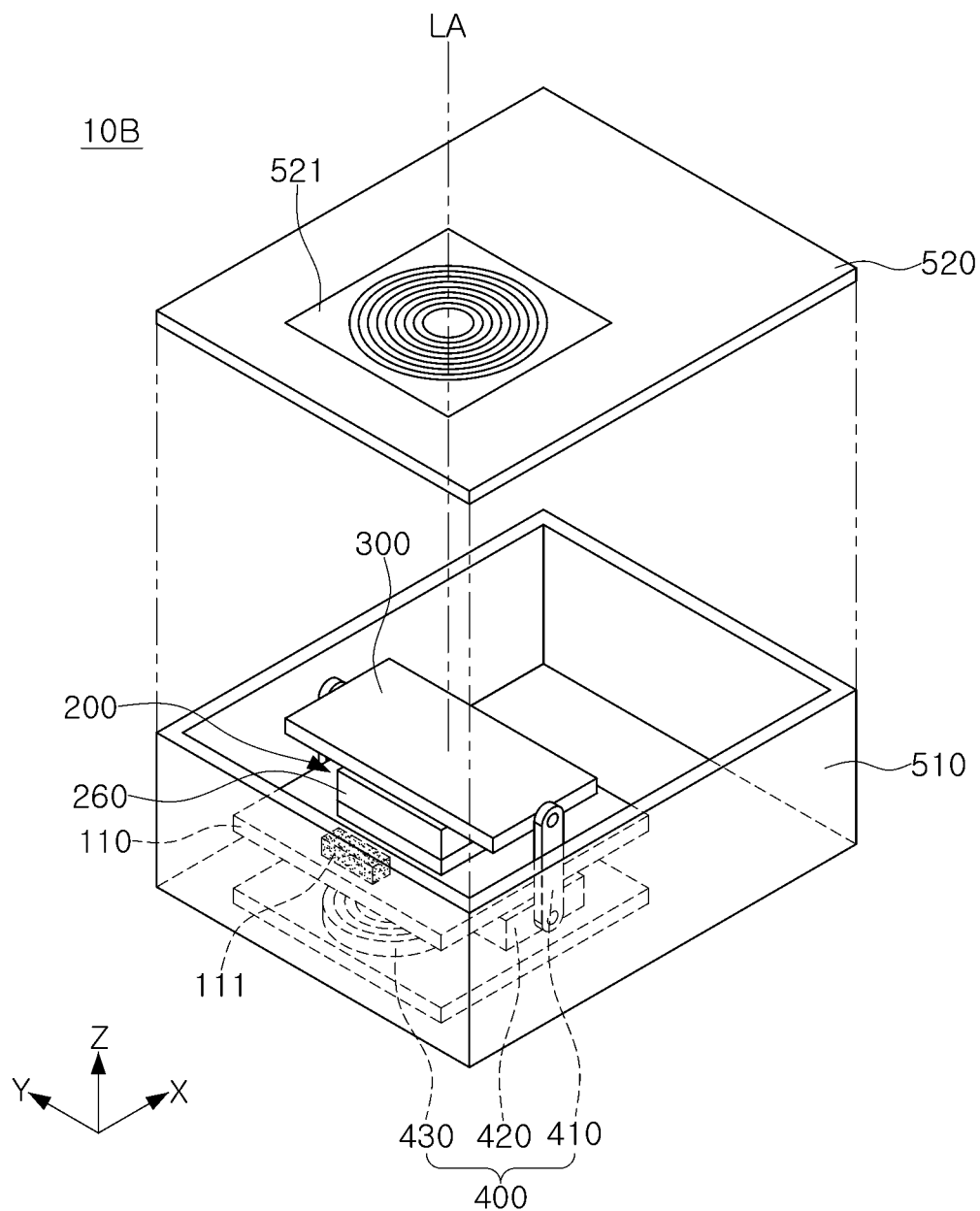
FIG. 6A is a perspective view showing a flash LED module according to an example embodiment of the present inventive concepts.
Figure 6B:
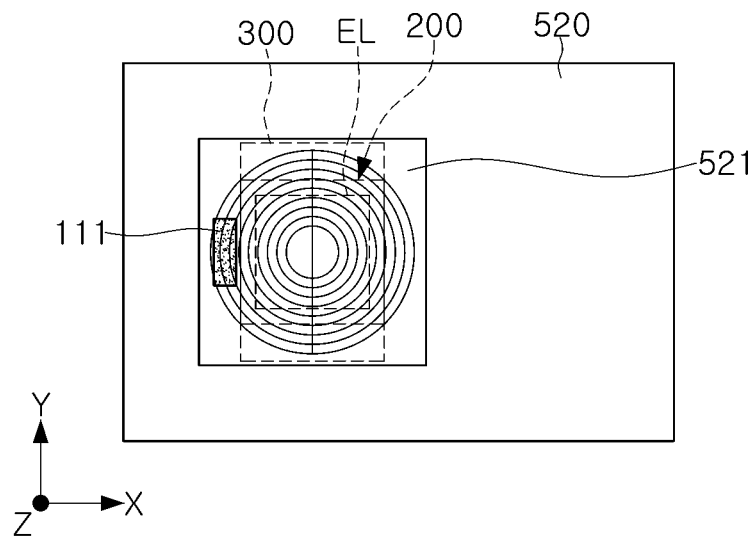
FIG. 6B is a plan view of the flash LED module of FIG. 6A.

FIG. 6A is a perspective view illustrating a flash LED module 10B according to an example embodiment of the present inventive concepts, and FIG. 6B is a plan view illustrating an upper surface of the Flash LED module 10B of FIG. 6A. In FIGS. 6A and 6B, a description of elements that have been previously described will be omitted for brevity.

Referring to FIGS. 6A and 6B, the flash LED module 10B of an example embodiment may include an optical sensor 111 disposed adjacent to the LED device 200 on the first substrate 110, and that does not overlap the shutter 300 in a first direction (Z-axis direction). The optical sensor 111 may be electrically connected to a circuit of the first substrate 110, and may be disposed to receive ambient light from the lens region 521 regardless of the position of the shutter 300. For example, as illustrated in FIG. 6B, in the non-operating state of the LED device 200, the light emitting region EL is completely covered by the shutter 300, while the optical sensor 111 may be disposed to be spaced apart from the shutter 300, and when the LED device 200 is operated, the shutter 300 may be moved in a direction that does not cover the optical sensor 111. Accordingly, the optical sensor 111 may monitor a state (e.g., a flicker state) of ambient light at all times regardless of the position of the shutter 300 to provide information for camera image quality correction.

Figure 7:
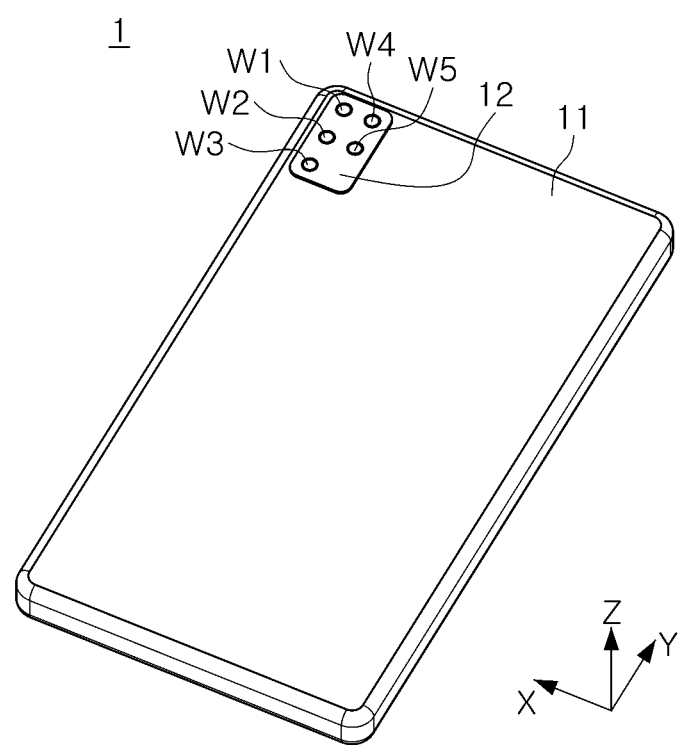
FIG. 7 is a perspective view illustrating an electronic device including a flash LED module according to various example embodiments of the present inventive concepts.
Figure 8:
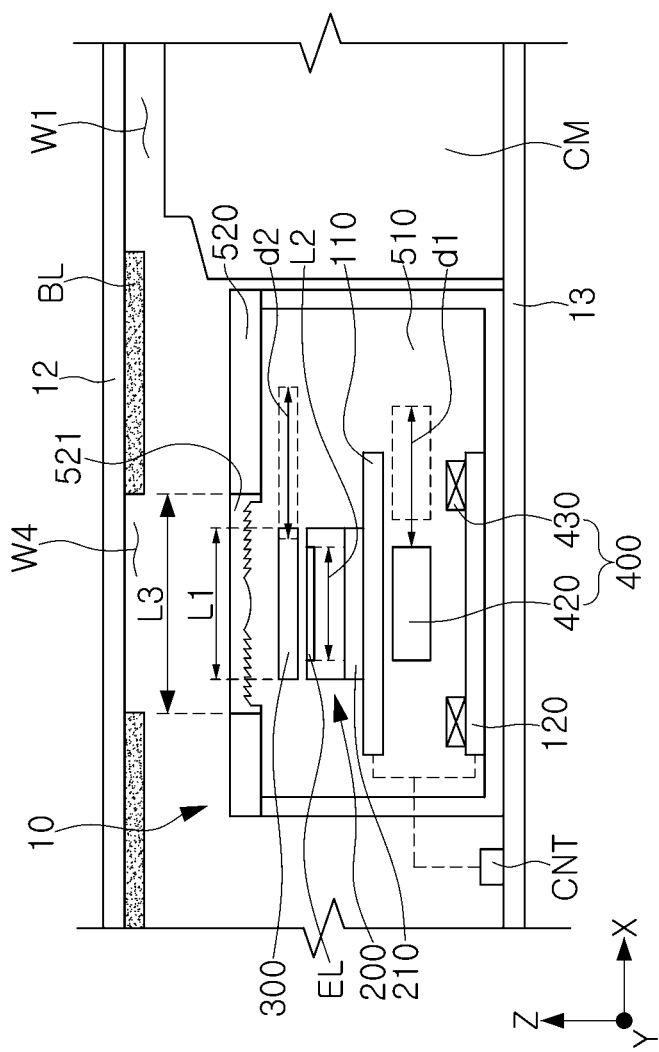
FIG. 8 is a cross-sectional view illustrating a state in which a flash LED module according to an embodiment of the present inventive concepts is assembled in the electronic device of FIG. 7.

FIG. 7 is a perspective view illustrating an electronic device 1 including a flash LED module according to various example embodiments of the present inventive concepts, and FIG. 8 is a cross-sectional view illustrating a state in which a flash LED module 10 is assembled according to an example embodiment of the present inventive concepts in the electronic device 1 of FIG. 7. In FIGS. 7 and 8, a description of elements that have been previously described will be omitted for brevity.

Referring to FIG. 7, the electronic device 1 may be a cellular phone such as a smart phone. However, this is merely an example, the electronic device 1 may be any electronic device including an optical window for optical devices (e.g., lighting, optical sensors, cameras, and the like) such as a notebook, a desktop, a monitor, a tablet, a digital camera, and the like. The electronic device 1 may include a set cover 11 and a transparent cover 12 disposed on one side of the set cover 11 and including a plurality of optical windows W1, W2, W3, W4, and W5. In an example, the optical windows W1, W2, W3, W4, and W5 may provide an optical path for a camera module, a flash module, and the like mounted in the electronic device 1. For example, the first optical window W1 may provide an optical path for a super wide angle camera, the second optical window W2 may provide an optical path for a wide angle camera, and the third optical window W3 may provide an optical path for a telephoto camera. The fourth optical window W4 may provide an optical path for the flash LED module such as flash LED modules 10, 10A, 10B described herein. The fifth optical window W5 may provide an optical path for an ambient light sensor such as an IR sensor. When the flash LED module 10, 10A, 10B employed in the electronic device 1 is the flash LED module 10B according to the example embodiment of FIGS. 6A and 6B, the optical sensor may receive ambient light through the fourth optical window W4. The fifth optical window W5 may be omitted.

Referring to FIG. 8, the flash LED module 10 according to example embodiments of the present inventive concepts may be mounted on a main board 13 in the set cover 11 (see FIG. 7) to emit light through the fourth optical window W4. Though flash LED module 10 is illustrated, it will be understood that flash LED modules 10A or 10B could be used as well without deviating from the scope of the inventive concepts. In addition, a camera module CM for capturing videos and images through another optical window, for example, the first optical window W1, may be mounted at a position that is adjacent to the flash LED module 10. The flash LED module 10 may be disposed below the optical window W4 formed on the transparent cover 12. The transparent cover 12 may be a transparent substrate such as glass, but is not limited thereto. A light blocking layer BL may be disposed on a lower surface of the transparent cover 12. The light blocking layer BL may block light from being transmitted to a remaining portion except for the fourth optical window W4. In addition, the light blocking layer BL may have a predetermined color. The color of the light blocking layer BL may be substantially the same as a color of the set cover 11. In an example embodiment, the color of the set cover 11, the color of the light blocking layer BL, and a color of the shutter 300 may be substantially the same color. Accordingly, in a non-operating state of the LED device 200, the electronic device may have a unified exterior with a predetermined color. For example, the flash LED module 10 may be disposed to emit light in a first direction (e.g., the Z-axis direction) through the fourth optical window W4 in the electronic device 1 including the fourth optical window W4 defined by a light blocking layer BL having a first color (e.g., the light blocking layer BL having the first color may surround a periphery of the fourth optical window W4). In this case, the flash LED module 10 may include a shutter 300 disposed between the light emission region EL and the fourth optical window W4, moved in a second direction (e.g., the X-axis direction), perpendicular to the first direction to open and close (e.g., expose and cover) the light emission region EL, and having the first color. In addition, the set cover 11 of the electronic device 1 may also have the first color.

As set forth above, according to example embodiments of the present inventive concepts, by providing a shutter having a predetermined color, it is possible to provide a flash LED module 10, 10A, 10B matching an exterior of an electronic device.

In addition, by disposing a shutter driving unit for moving the shutter below the LED device, a flash LED module of reduced size may be provided.

Various and beneficial advantages and effects of the present inventive concepts are not limited to the above description, and may be more easily understood in the course of describing specific embodiments of the present inventive concepts.

While the example embodiments have been shown and described above, it will be apparent to those skilled in the art that modifications and variations could be made without departing from the scope of the present inventive concepts as defined by the appended claims.

What is claimed is:

1. A flash light emitting diode (LED) module, comprising:
a first substrate comprising first and second opposing surfaces;
an LED device on the first surface of the first substrate, and comprising a light emitting region;
a shutter on the LED device, and configured to expose and cover the light emitting region;
a second substrate on the second surface of the first substrate, the first substrate overlapping the second substrate in a vertical direction that is substantially perpendicular to the first surface of the first substrate; and
a shutter driving unit on the second substrate and configured to move the shutter,
wherein the shutter driving unit comprises:
a magnetic field forming unit configured to generate a magnetic field in response to application of a current;
a power generation unit comprising a permanent magnet and configured to generate power in response to the magnetic field; and
a power transmission unit connected between the shutter and the power generation unit in the vertical direction and configured to transmit the power from the power generation unit to move the shutter, and
wherein at least one of the magnetic field forming unit or the power generation unit is on a side of the LED device opposite the shutter.

2. The flash LED module of claim 1, wherein the power transmission unit comprises a connection unit comprising a first end connected to the shutter and a second end connected to the permanent magnet, the connection unit configured to transmit the power to the shutter, and
wherein the at least one of the magnetic field forming unit or the power generation unit is between the first substrate and the second substrate in the vertical direction.

3. The flash LED module of claim 1, further comprising an optical sensor that is adjacent the LED device on the first substrate, wherein the optical sensor does not overlap the shutter in the vertical direction.

4. The flash LED module of claim 1, wherein the shutter driving unit is configured to move the shutter in a first direction,
wherein the magnetic field forming unit comprises a coil having an elliptical shape with a major axis that is arranged in a second direction that is parallel to the first direction.

5. The flash LED module of claim 1, further comprising a lens cover on the shutter,
wherein at least a partial region of the lens cover overlaps the shutter and the light emitting region in the vertical direction.

6. The flash LED module of claim 1, wherein the LED device comprises:
a wiring board comprising first and second wiring electrodes,
an LED chip on the wiring board and comprising a first surface, a second surface located opposite the LED chip to the first surface, and a side surface located between the first and second surfaces;
first and second electrodes on the first surface of the LED chip, the first and second electrodes respectively connected to the first and second wiring electrodes;
a wavelength conversion film on the second surface of the LED chip;
a reflective structure on the side surface of the LED chip and the light emitting region; and
a cell lens on the wavelength conversion film.

7. The flash LED module of claim 6, wherein the shutter has a first color, and
wherein the wavelength conversion film has a second color, different from the first color.

8. An electronic device, comprising
an optical window; and
a flash light emitting diode (LED) module configured to emit light in a first direction through the optical window, the flash LED module comprising:
an LED device comprising an LED chip and a reflective structure on a side surface of the LED chip, the reflective structure defining a light emitting region;
a shutter between the light emitting region and the optical window, the shutter configured to expose and cover the light emitting region by being moved in a second direction, perpendicular to the first direction, wherein the shutter comprises a surface that has a first color;
a shutter driving unit below the LED device, the shutter driving unit configured to move the shutter in the second direction; and
a light blocking layer surrounding a periphery of the optical window, the light blocking layer comprising a surface that has the first color.

9. The flash LED module of claim 8, wherein the LED device further comprises a wavelength conversion film on the LED chip, and
wherein the wavelength conversion film has a second color, different from the first color.

10. The flash LED module of claim 8, wherein the electronic device further comprises a set cover on which the flash LED module is mounted, wherein the optical window is on a surface of the set cover, and
wherein the surface of the set cover has the first color.

11. The flash LED module of claim 8, wherein the LED device, the shutter, and the shutter driving unit are disposed such that at least a portion of each overlaps in the first direction.

12. The flash LED module of claim 8, wherein a width of the shutter in the second direction is greater than or equal to a width of the light emitting region, and wherein the light blocking layer is separated from the reflective structure.

13. A flash light emitting diode (LED) module, comprising:

an LED device comprising an LED chip, a reflective structure on a side surface of the LED chip, and a light emitting region, wherein the reflective structure surrounds a periphery of the light emitting region;

a shutter on a first surface of the LED device and configured to expose and cover the light emitting region in a first direction;

a shutter driving unit on a second surface of the LED device opposite the first surface, the shutter driving unit configured to move the shutter in a second direction, perpendicular to the first direction;

a housing accommodating the LED device, the shutter, and the shutter driving unit; and a lens cover on the housing and comprising a lens region overlapping the light emitting region in the first direction, wherein a width of the light emitting region in the second direction is smaller than a width of the lens region in the second direction, and a width of the shutter in the second direction is equal to or greater than the width of the light emitting region in the second direction, wherein the shutter driving unit comprises:

a magnetic field forming unit configured to generate a magnetic field in response to application of a current; and a power generation unit comprising a permanent magnet and configured to generate power in response to the magnetic field, and wherein the shutter and the LED device overlap at least one of the magnetic field forming unit or the power generation unit in the first direction.

14. The flash LED module of claim 13, wherein the housing has a longitudinal axis extending in the second direction, and wherein the shutter driving unit is configured to move the shutter along the longitudinal axis of the housing.

15. The flash LED module of claim 13, wherein the lens region comprises a Fresnel lens having an optical axis passing through a center of the light emitting region.

16. The flash LED module of claim 13, further comprising a first substrate on which the LED device is disposed; and an optical sensor adjacent the LED device on the first substrate.

17. The flash LED module of claim 16, wherein the optical sensor does not overlap the shutter in the first direction.

18. The flash LED module of claim 13, wherein the shutter driving unit further comprises a power transmission unit having a first end connected to the shutter and a second end connected to the permanent magnet, the power transmission unit configured to transmit the power to move the shutter.

19. The flash LED module of claim 18, wherein the shutter is configured to move a second distance in the second direction in response to the permanent magnet moving a first distance in the second direction.

20. The flash LED module of claim 19, wherein the first distance and the second distance are substantially the same.

* * * * *